3,211,692
ETHYLENE POLYMERIC COMPOSITIONS
CONTAINING SUBSTITUTED UREAS
Thomas R. Hopkins and Paul D. Strickler, Shawnee Mission, and William C. Francis, Overland Park, Kans., assignors, by mesne assignments, to Gulf Oil Corporation, Pittsburgh, Pa., a corporation of Pennsylvania
No Drawing. Filed Jan. 2, 1963, Ser. No. 248,859
28 Claims. (Cl. 260—32.6)

This is a continuation-in-part of co-pending application Ser. No. 150,179, filed November 6, 1961, now abandoned which is a continuation-in-part of Ser. No. 60,781, filed October 6, 1960, now abandoned.

This invention relates to polymeric compositions having improved anti-blocking properties, and related processes. More particularly, it relates to ethylene polymer compositions having desired low blocking tendencies.

Polyethylene products, for example, films, tubes, and other objects, have a tendency to adhere strongly to each other when in contact, such as is displayed in a roll of film or in a stack of bags of untreated polyethylene. This adherence, referred to in the art as "blocking," is obviously inconvenient and troublesome, particularly when polyethylene bags, films, and the like are fed one-by-one from a stack into automatic packaging and filling mechanisms. Moreover, the blocking property of polyethylene objects, as is common knowledge, is magnified by applied pressures and by elevated temperatures.

Various solutions have been proposed to mitigate or eliminate blocking in polyethylene objects. For example, diverse organic compounds have been incorporated in polyethylene to cope with the problem. However, as a general rule, it has been found that if the incorporation of the organic compound solves at least in part the problem of blocking, such compositions usually invoke new problems such as lessened printability in films produced from these compositions. In respect to inorganic substances such as certain silicas which have been likewise incorporated in polyethylene compositions, the resulting polyethylene compositions have shown at times some mitigation of blocking, but the inorganic substances undesirably act as an abrasive during admixing with polyethylene resulting in grinding away small flecks of metal from the standard mixing apparatuses employed, such as Banbury mixers. The final product then has an unwanted grayish or metallic sheen.

An object of this invention is to provide ethylene polymers having improved properties. A further object of this invention is to provide ethylene polymers having low blocking properties. Another object of this invention is to provide processes of diminishing blocking in ethylene polymers. Other objects of this invention will be apparent from the disclosure herein set out.

By this invention is provided polymer compositions having low blocking properties wherein the preferred compositions have additionally excellent printability characteristics. The compositions comprise in admixture normally solid ethylene polymers and from 0.01 percent to about 1.0 percent by weight of a substituted urea, based on the weight of polymer, said urea having the following structure:

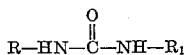

wherein R is alkyl or alkenyl having three to about thirty carbon atoms, preferably from about ten to about twenty-two carbon atoms, and wherein $R_1$ is hydrogen, phenyl, naphthyl, alkyl, or alkenyl, said alkyl and alkenyl radicals having from one to about thirty carbon atoms, preferably from about ten to about twenty-two carbon atoms.

R and $R_1$ in the above formula taken together have a sum of six to about fifty carbon atoms. $R_1$ in the above formula is preferably hydrogen, alkyl, or alkenyl. In referring herein to alkyl, alkenyl, phenyl, and naphthyl radicals, it is to be understood that those radicals are included which have substituents which do not interfere with the desired anti-block activity of the provided urea when incorporated into the polymers and which do not interfere with the compatibility and usability of the urea in the polymer compositions. For example, the alkyl and alkenyl radicals can have certain non-interfering radicals such as alkoxy and hydroxy groups. As to the phenyl and naphthyl radicals as hereinafter exemplified, these radicals can contain non-interfering and compatible substituents such as alkyl, alkoxy, hydroxy, alkenyl, and the like. By alkyl and alkenyl are also included those radicals of a branched or a cyclic character, for example, cyclohexyl, cyclopentyl, cycloheptyl, and corresponding alkenyl radicals. Alkyl radicals also include such operative radicals as arylalkyl, cycloalkylalkyl, and cycloalkenylalkyl radicals.

Illustrative alkyl and alkenyl radicals employable as R and $R_1$ substituents include the following: isopropyl, butyl, t-butyl, heptyl, hexyl, 2-ethylhexyl, nonyl, decyl, undecyl, dodecyl, uncosyl octenyl, decenyl, oleyl, erucyl, and the like. Illustrative radicals employable as an $R_1$ substituent include additionally the following: phenyl, methoxyphenyl, tolyl, benzyl, phenylethyl, phenoxyethyl, p-hydroxyphenyl, alpha-naphthyl, beta-naphthyl, beta-hydroxyethyl, cyclohexylethyl.

Illustrative of the compounds which can be employed in this invention are the following substitutedureas: N-nonylurea, N,N'-didecylurea, N-dodecylurea, N-decenylurea, N-erucylurea, N,N'-biserucylurea, N-undecyl-N'-decylurea, N-dodecyl-N'-erucylurea, N-octadecyl - N'-erucylurea, N-(alpha-naphthyl)-N'-octadecylurea, N-(p-oleanilido)-N'-octadecylurea, N,N'-dicosylurea, N-(p-hydroxyphenyl)-N'-octadecylurea, N - (o-methoxyphenyl)-N'-octadecylurea, N-(o-tolyl)-N'-dodecylurea.

Some of the presently preferred substituted ureas include N-octadecylurea, N-oleylurea, N,N'-bisoleylurea, N,N'-didodecylurea, and N-undecylurea.

Ethylene polymers as used in this invention means both homopolymers of ethylene as well as blocking interpolymers of ethylene wherein the interpolymer has incorporated up to about 0.5 mole of a polymerizable vinyl monomer having carbon to carbon unsaturation per mole of ethylene groups. The vinyl monomers include polymerizable alkyl esters of unsaturated carboxylic acids such as lower alkyl acrylates and methacrylates (e.g., methyl acrylate, methyl methacrylate, ethyl acrylate, butyl acrylate, t-butyl acrylate, etc.), unsaturated carboxylic acids and salts thereof such as acrylic and methacrylic acids and sodium salts thereof, other alpha olefins such as propylene, 1-butene, isobutylene, 4-methyl-1-pentene, and the like, vinyl esters such as vinyl acetate, vinyl propionate, and the like, as well as the corresponding hydroxy hydrolysis product thereof. Where the vinyl comonomer has an alkyl group, it is preferred that the alkyl group has 1 to 4 carbon atoms. As far as this invention is concerned with respect to ethylene copolymers, the copolymers having incorporated up to about 0.2 mole of a polymerizable vinyl comonomer per mole of ethylene are preferred. A further preferred ethylene copolymer of the compositions of this invention are the lower alkyl acrylate and alkyl methacrylate copolymers having up to about 0.2 mole of incorporated acrylic groups per mole of ethylene groups, particularly preferred acrylic esters being the methyl acrylate and methyl methacrylate esters. The preferred copolymers are provided by the processes described in British Patent No. 900,969.

Other suitable copolymers can be provided by methods known to the art, including bulk, solution, and the like polymerization methods.

A preferred concentration of the urea, as above defined, in the compositions is about 0.02 percent to about 0.15 percent, on the basis of the weight of the polymer. If desired, from about 0.01 percent to about 0.5 percent of a slip agent, e.g., oleamide, is incorporated in the compositions, and preferably about 0.025 percent to 0.1 percent on the basis of weight of ethylene polymer.

The compositions of this invention can be provided by adding an amount of one of the above substituted ureas or combinations thereof, e.g., N-octadecylurea, in accordance with the above ranges to a normally solid ethylene polymer employed in the manufacture of films, bags, molded articles, and other consumer items. The urea and polymer combination is thoroughly mixed by using apparatuses customarily employed in forming homogenous blends of polymer compositions containing additives, such as Banbury mixers, compounding extruders, roll mills, and the like. Conditions employed in such mixing, such as temperature, length of mixing periods, pressures, and the like, are those within the skill of the polymer art.

The urea compounds of the compositions in this invention can be provided by following known urea synthesis procedures such as by the reaction of the appropriate isocyanate (i.e., R—NCO) with the required amine in an inert reaction solvent. Illustratively, n-octadecylurea and N-octadecyl-N'-oleylurea can be provided by the reactions of n-octadecyl isocyanate with equimolar quantities of ammonia and oleylamine, respectively. The desired urea product can be removed from the reaction mixture and purified, as desired, employing conventional organic synthesis techniques.

Films, tubes, plates, and the like are provided from the above compositions by employing devices and processes customarily employed in the preparation of such articles from polyethylene. Illustratively speaking, film can be provided from the compositions by using film extruders, blown film machines, and the like.

In evaluation of the blocking characteristics of the polymer compositions in this invention, film is provided by standard procedures and is evaluated following a plate method carried out as follows: Five-inch squares of a collapsed tube of blown film are carefully severed from a roll without stretching or otherwise distorting and leaving the block of the internal surfaces of the tube intact. A blocked square is centered between two four-inch square metal plates leaving about a one-half inch margin protruding from each edge of the plates. The plates are affixed, in a horizontal plane, to the upper and lower jaws of a testing machine so that the plates are in direct alignment and with the films carefully taped to the respective bottom and top plates. The blocking measure is the load in grams required to separate the film sections.

As to printability evaluation, the customary pressure sensitive tape test is employed. The film is electrically heat treated in the usual manner prior to testing as by Tesla coils. The treated film is inked, or "printed," with printing ink using a narrow roller-type inking device. Basically, the test is a measure of the amount of ink that can be removed from a "printed" portion of the film by pressing to the printed portion a pressure sensitive tape followed by a rapid tearing away of the tape from the film. In this test, films of the preferred polyethylene compositions of this invention show excellent printability, i.e., substantially no ink is removed by the tape.

The slip evaluations are determined by the following standard procedure: The apparatus employed is a moving platform—stationary sled type, in which the sled and the platform are in leveled horizontal planes and the sled is superimposed on the platform. The sled consists of a rectangular metal block having surface dimensions of two and one-half inches by four inches, the sled being weighted to 325 grams. To the platform having dimensions of approximately eight inches by twenty-four inches is affixed by taping a section of blown film with the inside tube surface exposed, with the axis of the machine direction of the film coinciding with the longitudinal axis of the sled. A section of film is attached to the sled in like manner finally leaving the respective inside surfaces of the film sections in gravity contact when in testing position. The platform is moved in the horizontal plane in the machine direction of the films to provide a slipping action of the film of the stationary sled over the film of the moving platform, at a rate of about thirty inches per minute. The average pull in grams, or slip value, is automatically recorded. The film is conditioned for at least sixteen hours under the standard laboratory conditions prior to conducting the test.

Other additives employed in polyethylene compositions can also be incorporated in the compositions of this invention. For example, slip agents (such as oleamide), anti-oxidants, fillers, pigments, lubricants, and the like can be incorporated in desired quantities following usual procedures. Preferably, the additional additives are added in lesser quantities than those which substantially interfere with the desired characteristics of the compositions of this invention.

As above stated, the ethylene polymer compositions of this invention are particularly useful for the manufacture of films, sheets, tubing, and the like. However, the compositions can also be used in certain molding applications, such as in the manufacture of injected molded objects, in certain coating applications, and the like where low blocking tendencies are desired.

The following illustrative examples are given by way of further description of this invention, but not in limitation thereof.

EXAMPLE 1

Polyethylene compositions are prepared having additive concentrations as shown in the following tables. In the preparation of the compositions, a film grade polyethylene having a density of about 0.924 and a melt index of about 1.3 is employed in cubed form. Solid N-octadecyl urea is added in the indicated amounts to 100-part quantities of polyethylene at flux, and the combinations are thoroughly admixed to form a uniform blend with a Banbury mixer during which the melt is maintained at about 240° F. for about three minutes. The resulting uniform polyethylene compositions are formed into film by using a standard blown film machine, the resulting film having a thickness of about one mil. The provided films have the blocking properties set out in following table:

*Table I*

| Polyethylene composition | N-octadecyl urea concentration (Percent by wt.) | Degree of blocking (grams) |
| --- | --- | --- |
| 1 | 0.0 | 49.4 |
| 2 | 0.04 | 27.6 |
| 3 | 0.08 | 17.3 |

The data of Table II show the N-octadecyl urea concentrations employed in the above compositions do not interfere with the desired action of the slip agent—oleamide, and conversely, N-octadecyl urea is highly effective in the presence of the slip agent. The compositions described in Table II, some of which include concentrations of oleamide (the product "G.A." marketed by Fine Organics, Inc., is employed) are prepared in accordance with the hereinabove set out procedure.

Table II

| Polyethylene composition | Oleamide concentration | N-octadecyl urea concentration | Degree of slip (grams) | Degree of blocking (grams) |
|---|---|---|---|---|
| 1 | 0.0 | 0.0 | 400 | 49.4 |
| 2 | 0.04 | 0.0 | 180 | 54.9 |
| 3 | 0.04 | 0.04 | 156 | 35.3 |
| 4 | 0.04 | 0.08 | 121 | 18.5 |
| 5 | 0.08 | 0.0 | 70 | 59 |
| 6 | 0.08 | 0.04 | 66 | 35.3 |
| 7 | 0.08 | 0.08 | 50 | 26.5 |

EXAMPLE 2

Anhydrous ammonia is slowly passed into a solution of oleyl isocyanate, 20 g., in 200 ml. of dry benzene while maintaining the reaction temperature below 50° with external cooling. After one hour, the reaction mixture is diluted with three volumes of hexane, and the resultant solid precipitate is removed by filtration. After recrystallizations from ethanol and acetone, a white crystalline solid of N-oleylurea, M.P. 84–86°, is obtained.

*Analysis.*—Calcd. for $C_{19}H_{38}N_2O$: C, 73.49; H, 12.33; N, 9.02. Found: C, 73.61; H, 11.80; N, 8.91.

By the incorporation of 0.075 percent by weight, based on polyethylene, of N-oleylurea into a base polyethylene, blocking was reduced from a value of .01 to 12.6.

EXAMPLE 3

Behenic acid chloride (obtained by the reaction of behenic acid and thionyl chloride), 100 g., is converted to behenic acid azide by reaction with sodium azide, 32 g., in aqueous acetone at 10–15°. The crude azide reaction product is dissolved in benzene (2 l.), dried and rearranged to crude uncosyl isocyanate by heating at 65–70° C. After removal of the benzene, the isocyanate reaction product is dissolved in hexane (1.5 l.), the solids are removed by filtration and the filtrate is treated with anhydrous ammonia. A sticky solid product is obtained by filtration which is recrystallized from dioxane to yield crystalline uncosylurea, M.P. 102–106° C.

*Analysis.*—Calcd. for $C_{22}H_{46}N_2O$: C, 74.51; H, 13.08; N, 7.90. Found: C, 74.63; H, 13.03; N, 8.51.

By the incorporation of 0.1 percent by weight, based on polyethylene, of N-uncosylurea into a base polyethylene, blocking was reduced from a value of 67 to 49.4.

EXAMPLE 4

Oleylamine, 35 g., is added with vigorous agitation to a solution of phenyl isocyanate, 18 g., in 175 ml. of dry benzene over a two-hour period. The reaction mixture is allowed to stir an additional 18 hours. The benzene is removed under reduced pressure and the residue is recrystallized from hexane. The crude product thus obtained was fractionally recrystallized from acetone to yield a white recrystalline solid product, M.P. 50–51° C. of N-oleyl-N'-phenylurea.

*Analysis.*—Calcd. for $C_{25}H_{42}N_2O$: C, 77.66; H, 10.95; N, 7.25. Found: C, 77.98; H, 10.79; N, 7.24.

By the incorporation of 0.075 percent by weight, based on polyethylene, of N-oleyl-N'-phenylurea into a base polyethylene, blocking was reduced from a value of 91 to 40.6.

EXAMPLE 5

Following the procedure of Example 4, N-oleyl-N'-(beta-naphthyl)urea is provided by the reaction of oleylamine and β-naphthylisocyanate in benzene. The product is recrystallized from ethanol, M.P. 105–107° C.

*Analysis.*—Calcd. for $C_{29}H_{44}N_2O$: C, 79,76; H, 10.16; N, 6.42. Found: C, 79.25; H, 9.96; N, 6.26.

By the incorporation of 0.075 percent by weight, based on polyethylene, of N-oleyl-N'(β-naphthyl) urea into a base polyethylene, blocking is reduced.

EXAMPLE 6

Following the procedure of Example 4, N-oleyl-N'-(p-octyloxyphenyl)urea is prepared by the reaction of p-octyloxyaniline and oleyl isocyanate in benzene. The desired product is recrystallized from a dioxane-methanol mixture, M.P. 79° C.

*Analysis.*—Calcd. for $C_{33}H_{58}N_2O_2$: C, 76.99; H, 11.36; N, 5.44. Found: C, 76.80; H, 11.54; N, 5.39.

By the incorporation of 0.075 percent by weight, based on polyethylene, of N-oleyl-N'-(p-octyloxyphenyl)urea into a base polyethylene, blocking was reduced from a value of 91 to 9.0.

EXAMPLE 7

Following the procedure of Example 4, N-oleyl-N'-(beta-hydroxyethyl)urea is prepared from monoethanolamine and oleyl isocyanate in hexane. The desired product is recrystallized from ethanol, M.P. 84–85° C.

*Analysis.*—Calcd. for $C_{21}H_{42}N_2O_2$: C, 71.13; H, 11.94; N, 7.90. Found: C, 71.01; H, 12.02; N, 7.91.

By the incorporation of 0.075 percent by weight, based on polyethylene, of N-oleyl-N'-(beta-hydroxyethyl)urea into a base polyethylene, blocking was reduced from a value of 91 to 33.8.

EXAMPLE 8

Following the procedure of Example 4, N-octadecyl-N'-methoxyurea is prepared from methoxyamine and octadecyl isocyanate in hexane. The desired product is recrystallized from ethanol, M.P. 93–94° C.

*Analysis.*—Calcd. for $C_{20}H_{42}N_2O_2$: C, 70.12; H, 12.36; N, 8.18. Found: C, 70.40; H, 12.06; N, 7.92.

By the incorporation of 0.075 percent by weight, based on polyethylene, of N-octadecy-N'-methoxyurea into a base polyethylene, blocking was reduced from a value of 91 to 22.

EXAMPLE 9

Following the procedure of Example 4, N-octadecyl-N'-phenylurea is prepared by the reaction of octadecylamine and phenyl isocyanate in dimethylformamide. The desired product is recrystallized from acetone, M.P. 95–97° C.

*Analysis.*—Calcd. for $C_{25}H_{44}N_2O$: C, 77.26; H, 11.41; N, 7.21. Found: C, 77.17; H, 11.49; N, 7.20.

By the incorporation of 0.075 percent by weight, based on polyethylene, of N-octadecyl-N'-phenylurea into a base polyethylene blocking was reduced from a value of 91 to 49.

EXAMPLE 10

Following the procedure of Example 4, N-octadecyl-N'-(p-methoxyphenyl)urea is prepared by the reaction of p-anisidine and octadecyl isocyanate in dioxane. The desired product is recrystallized from heptane, M.P. 117–118° C.

*Analysis.*—Calcd. for $C_{26}H_{46}N_2O_2$: C, 74.59; H, 11.08; N, 6.69. Found: C, 74.16; H, 11.20; N, 6.80.

By the incorporation of 0.075 percent by weight, based on polyethylene, of N-octadecyl-N'-(p-methoxyphenyl) urea into a base polyethylene, blocking was reduced from a value of 91 to 47.

EXAMPLE 11

Following the procedure of Example 4, N-octadecyl-N'-(alpha-naphthyl)urea is prepared by the reaction of octadecylamine and alpha-naphthyl isocyanate in dimethylformamide. The desired product is recrystallized from ethanol, M.P. 123–124° C.

*Analysis.*—Calcd. for $C_{24}H_{46}N_2O$: C, 79.40; H, 10.57; N, 6.39. Found: C, 79.30; H, 10.34; N, 6.28.

By the incorporation of 0.1 percent by weight of N-octadecyl-N'-(alpha-naphthyl)urea, based on polyethylene, the blocking tendency is greatly reduced.

EXAMPLE 12

Following the procedure of Example 4, N-octadecyl-N'-(p-oleoylaminophenyl)urea is prepared by the reaction of p-oleoylaminoaniline and octadecyl isocyanate in benzene. The desired product is recrystallized from dioxane, M.P. 190–195° C.

*Analysis.*—Calcd. for $C_{43}H_{77}N_3O_2$: C, 77.30; H, 11.62; N, 6.29. Found: C, 77.01; H, 11.81; N, 6.41.

By the incorporation of 0.1 percent by weight of N-octadecyl-N'-(p-oleoylaminophenyl)urea, based on polyethylene, the blocking tendency is greatly reduced.

EXAMPLE 13

Other specific compositions wherein reduction of blocking of the base polyethylene is achieved, are shown in the following:

| Urea added | Amt. urea added (percent by wt.) | Reduction of blocking |
| --- | --- | --- |
| N,N'-bisoleoylurea | 0.075 | 91 to 15.0. |
| N-undecylurea | 0.1 | 67 to 22. |
| N,N'-diisopropylurea | 0.1 | 67 to 2.0. |
| N,N'-didodecylurea | 0.1 | 67 to 10.2. |
| N,N'-bisoctadecoylurea | 0.1 | 67 to 44.6. |

Employing, for example, appropriate conventional-blown film procedures and a substituted urea agent capable of sublimation, it has been found in this respect that when, e.g., diisopropylurea is employed, that the subsituted urea in large measure largely sublimates away from the outside surface of the blown film tube but excellent antiblocking properties remain imparted on the inside surfaces of the film tube. This is an important aspect since such a tube can be formed into easily opened bags, e.g., fertilizer or other packaging bags, but yet provides blocking sufficient for good stacking of filled bags and good outside printing properties.

EXAMPLE 14

An elastomeric ethylene-methyl acrylate copolymer having 15% methyl acrylate groups by weight is provided by the processes of the above referred to British Patent No. 900,969. The copolymer has a density of 0.9365 g./cc., a melt index of 1.72, an elongation at yield value of 500%, a value of zero failures of standard test parts in a 6-day period in environmental stress crack test ASTM D1693–60T, and shows an even distribution of methyl acrylate groups within the copolymer chains in the above referred to pyrolytic degradation and differential thermal analysis tests.

Additionally, an ethylene-methyl acrylate copolymer having 25 percent methyl acrylate groups by weight and an ethylene-methyl methacrylate copolymer having 20 percent methyl methacrylate groups by weight are provided by the same process. Further copolymers can be derived from the above acrylate copolymers by converting at least a portion of the acrylate groups to free-carboxylic acid groups or sodium carboxylic groups.

An ethylene-vinyl acetate copolymer having 15 percent by weight of vinyl acetate groups is provided by well-known bulk polymerization methods. A portion of the ethylene-vinyl acetate copolymer is hydrolyzed to form the corresponding alcohol copolymer.

Based on the weight of the ethylene polymer, 0.1 percent by weight of the following substituted ureas are incorporated into the above ethylene copolymers following the procedures of the above examples to provide ethylene polymers exhibiting reduced blocking tendencies: N-octadecyl urea, N-oleylurea, N-oleyl - N' - (p-octyloxyphenyl)urea, N-oleyl-N' - (beta - hydroxyethyl)urea, N-octadecyl-N'-phenylurea, N-octadecyl-N'-(p-oleoylaminophenyl)urea, N,N'-bisoleylurea, N,N' - diisopropylurea, and N,N'-bisoctadecylurea.

The substituted ureas having a degree of volatility at the temperatures at which the blown film thereof is extruded, provide a highly interesting blown film tube amenable to bag fabrication wherein the inner surface has remarkably high anti-blocking properties whereas the outside surface frequently contains much lower concentrations of substituted urea.

What is claimed is:

1. A polymeric composition having low blocking tendencies comprising in admixture a major portion of a normally solid ethylene polymer and from about 0.01 percent to about 1.0 percent of a substituted urea, based on the weight of ethylene polymer, said ethylene polymer being selected from the group consisting of homopolymers of ethylene and copolymers of ethylene and up to about 0.5 mole of a vinyl monomer copolymerizable therewith, and said substituted urea having the following structural formula:

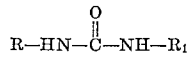

wherein R is selected from the group consisting of alkyl and alkenyl radicals having from three to about thirty carbon atoms, wherein $R_1$ is selected from the group consisting of hydrogen, phenyl, naphthyl, alkyl and alkenyl radicals, said alkyl and alkenyl radicals having from one to about thirty carbon atoms, and wherein said R and $R_1$ radicals have the sum of six to about fifty carbon atoms.

2. Composition in accordance with claim 1 wherein the concentration of the substituted urea is from about 0.02 percent to about 0.15 percent, based on the weight of polymer.

3. A composition of claim 1 wherein R has ten to about twenty-two carbon atoms.

4. A composition of claim 1 wherein R is alkyl.

5. A composition of claim 1 wherein R is an alkyl having from ten to about twenty-two carbon atoms.

6. A composition of claim 1 wherein R and $R_1$ are alkyl radicals having ten to about twenty-two carbon atoms.

7. A composition of claim 1 wherein the urea employed is a monosubstituted urea wherein R is alkyl having ten to about twenty-two carbon atoms.

8. A composition of claim 1 wherein R is alkenyl.

9. A composition of claim 1 wherein R is an alkenyl radical having from ten to about twenty-two carbon atoms.

10. A composition of claim 1 wherein R and $R_1$ are alkenyl radicals having from ten to about twenty-two carbon atoms.

11. A composition of claim 1 wherein the urea employed is a monosubstituted urea wherein R is alkenyl having from ten to about twenty-two carbon atoms.

12. A composition of claim 1 wherein the substituted urea employed is N-octadecylurea.

13. A composition of claim 1 wherein the substituted urea employed is N-undecylurea.

14. A composition of claim 1 wherein the urea employed is N,N'-didodecylurea.

15. A composition of claim 1 wherein the urea employed is N,N'-bisoleylurea.

16. A composition of claim 1 wherein the urea employed is N-oleylurea.

17. A polymeric composition having low blocking tendencies comprising in admixture a major portion of a normally solid ethylene polymer and from about 0.01 percent to about 1.0 percent of a substituted urea, based on the weight of polymer, said ethylene polymer being selected from the group consisting of homopolymers of ethylene and copolymers of ethylene and up to about 0.5 mole of a vinyl monomer copolymerizable therewith, and said substituted urea having the following structural formula:

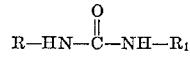

wherein R is selected from the group consisting of alkyl and alkenyl radicals having from three to about thirty carbon atoms, wherein $R_1$ is selected from the group consisting of hydrogen, phenyl, naphthyl, alkyl, and alkenyl radicals, said alkyl and alkenyl radicals having from one to about thirty carbon atoms, and wherein said R and $R_1$ radicals have the sum of six to about fifty carbon atoms, and from about 0.01 percent to about 0.5 percent of oleamide, based on the weight of polymer.

18. A composition of claim 17 wherein the amount of oleamide employed is from about 0.025 percent to about 0.1 percent.

19. A composition of claim 1 wherein the polymer is polyethylene.

20. A composition of claim 1 wherein the polymer is an ethylene-alkyl acrylic ester copolymer wherein the alkyl group of the said acrylic ester contains from 1 to 4 carbon atoms.

21. A composition of claim 1 wherein the substituted urea is n-octadecyl urea and the polymer is polyethylene.

22. A composition of claim 1 wherein the substituted urea is n-octadecyl urea and the polymer is an ethylene-alkylacrylic ester copolymer wherein the alkyl group of the said acrylic ester contains from 1 to 4 carbon atoms.

23. A composition of claim 1 wherein the substituted urea is diisopropylurea and the polymer is polyethylene.

24. A composition of claim 1 wherein the substituted urea is diisopropylurea and the polymer is an alkyl acrylic ester copolymer wherein the alkyl group of the said acrylic ester contains from 1 to 4 carbon atoms.

25. A composition of claim 1 in the form of a film having at least one surface of said film having anti-block properties provided by said substituted urea.

26. A film of claim 25 wherein the polymer is polyethylene.

27. A film of claim 25 wherein the polymer is an ethylene-alkyl acrylic ester copolymer wherein the alkyl group of the said acrylic ester contains from 1 to 4 carbon atoms.

28. A film of claim 25 wherein only one surface has substantial anti-blocking properties.

References Cited by the Examiner

UNITED STATES PATENTS

| 2,770,609 | 11/56 | Symonds | 260—32.6 |
| 2,894,933 | 7/59 | Schweitzer | 260—45.9 |
| 2,960,488 | 11/60 | Tawblyn et al. | 260—45.9 |

FOREIGN PATENTS

| 867,280 | 5/61 | Great Britain. |
| 876,710 | 9/61 | Great Britain. |

MORRIS LIEBMAN, *Primary Examiner.*